(12) United States Patent
Grossmann et al.

(10) Patent No.: US 8,872,378 B2
(45) Date of Patent: Oct. 28, 2014

(54) METHOD FOR OPERATING A CONTROL CIRCUIT, PARTICULARLY FOR USE IN A MOTOR VEHICLE

(75) Inventors: Alex Grossmann, Leonberg (DE); Mattias Hallor, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 13/258,594

(22) PCT Filed: Apr. 7, 2010

(86) PCT No.: PCT/EP2010/054581
§ 371 (c)(1),
(2), (4) Date: Dec. 12, 2011

(87) PCT Pub. No.: WO2010/118978
PCT Pub. Date: Oct. 21, 2010

(65) Prior Publication Data
US 2012/0074773 A1 Mar. 29, 2012

(30) Foreign Application Priority Data
Apr. 17, 2009 (DE) .......................... 10 2009 002 464

(51) Int. Cl.
*B60L 1/00* (2006.01)
*H02P 29/02* (2006.01)
*H02P 7/00* (2006.01)

(52) U.S. Cl.
CPC ............ *H02P 7/0044* (2013.01); *H02P 29/021* (2013.01)
USPC ........................................ 307/10.1

(58) Field of Classification Search
USPC .................. 307/113, 115, 116, 125, 130, 131
See application file for complete search history.

(56) References Cited

U.S. PATENT DOCUMENTS 5,428,522 A * 6/1995 Millner et al. .................. 363/63
5,784,270 A * 7/1998 Permuy .......................... 363/132

(Continued)

FOREIGN PATENT DOCUMENTS

| CN | 1147725 | 4/1997 |
|----|---------|--------|
| EP | 1341294 | 9/2003 |
| JP | 8-84494 | 3/1996 |

OTHER PUBLICATIONS

International Search Report, PCT International Application No. PCT/EP2010/054581, dated Nov. 4, 2010.

Primary Examiner — Rexford Barnie
Assistant Examiner — Daniel Kessie
(74) *Attorney, Agent, or Firm* — Kenyon & Kenyon LLP (57) ABSTRACT

A method for operating a control circuit having a first output and a second output and having an allocated first switching arrangement and an allocated second switching arrangement, in which a control voltage present between the outputs for operating a load, in particular of a motor vehicle, is formed in that the first output is optionally connected by a switching arrangement to a first potential or to a second potential, and the second output is optionally connected by a switching arrangement to the first potential or to the second potential, a state in which the control voltage is intended to be at least briefly and at least approximately zero being brought about in a first case in that the two outputs are simultaneously connected by the two switching arrangements to the first potential, and being brought about in a second case in that the two outputs are simultaneously connected by the two switching arrangements to the second potential, both cases being brought about at least once during operation of the control circuit, and, both in the first case and in the second case, a difference between two output potentials that characterizes the control voltage present at the outputs, or that characterizes a current flowing through at least one shunt resistor situated in series to the outputs and/or in series to switches, being acquired and being subjected to a comparison.

20 Claims, 7 Drawing Sheets

(56) References Cited

U.S. PATENT DOCUMENTS

| | | | |
|---|---|---|---|
| 5,821,701 A * | 10/1998 | Teggatz et al. | 315/307 |
| 6,087,863 A * | 7/2000 | Aflatouni | 327/111 |
| 7,397,150 B2 | 7/2008 | Grossmann et al. | |
| 2006/0221525 A1 | 10/2006 | Konishi | |

* cited by examiner

METHOD FOR OPERATING A CONTROL CIRCUIT, PARTICULARLY FOR USE IN A MOTOR VEHICLE

BACKGROUND INFORMATION

Pulse-width-modulated signals (hereinafter PWM signals) are used in many applications in electrical engineering. These are signals having two allocated logical levels, or potentials. In general, relative to the time axis they may occur either in time-discrete or in time-continuous fashion. A main area of application of PWM signals is the representation of analog quantities in a digital system, as found for example in phase detectors in clock control loops or, in the present case, in controlling tasks using bridge circuits in power electronics.

European Patent No. EP 1 341 294 B1 describes an H-bridge circuit is known for use in a motor vehicle in which a predefined clocked course of a control voltage is set by switching more than one of the controllable switching arrangements. Here the switching arrangements are controlled such that in a first operating mode switching processes take place only in a first controllable switching means, whereas in a second operating mode switching processes take place only in a second controllable switching means, and a changeover is made periodically between the two operating modes, so that for a control voltage having a sign that remains constant, in alternating fashion a periodically clocked signal is produced at one of the two outputs and a constant signal is simultaneously produced at the other of the two outputs.

SUMMARY

An object of the present invention is to improve operational reliability in the use of a control circuit.

In accordance with the present invention, in a control circuit operated in the manner of an H-bridge and having switching arrangements controllable independently from one another using one or more static or dynamic control signals of a control unit, a plurality of operating modes are possible that yield the same output result relative to a two-pole load. In this way, the signals present at the two-pole load in the specific operating modes can be compared, in the occurrent combinations of the switching states of the switching arrangements, with target values in order to detect possible short-circuits of the outputs to the potentials of an operating voltage. The advantage of the present invention is that in each case of operation the two outputs are dynamically controlled so that possible short-circuits of the outputs to the potentials of the operating voltage can be reliably recognized. For this purpose, during operation a state is used or is brought about in which the control voltage of a load is, at least briefly and at least approximately, zero, whereupon in a first case the two outputs are simultaneously connected by the two switching arrangements to a first potential, and in a second case are simultaneously connected to a second potential, and, in case-by-case fashion, the difference between the output potentials characterizing the control voltage present at the outputs is acquired and is subjected to a comparison in the control and regulating device. In addition, in a useful simplification the output stages of the bridge contain shunt resistors that can be situated both in series to the two outputs and also in series to the four switches forming the bridge. Here, in all switching states of the bridge the currents flowing through the shunt resistors are continuously determined and compared to threshold values or target values, so that when these values are exceeded an alarm can take place or a changeover to emergency operating mode can take place.

The possibility of detecting short-circuits increases the reliability of the operation of the control circuit, because damage to the components that are to be controlled can be avoided, as can operating states of these components that are not desired by the user.

Here, during a state in which the control voltage is supposed to be at least briefly and at least approximately zero, it can make sense to switch over at least once between the first and the second case or between the second and the first case. In this way, the output potentials are changed within a very short time without disadvantage for the load present at the control voltage, so that all four possibilities for short-circuiting of two outputs to two potentials can be very quickly recognized and assigned.

In an advantageous embodiment of the present invention, phases in which the control voltage is supposed to be at least briefly and at least approximately zero are brought about according to a particular clocking scheme, once through the first case and another time through the second case. This can for example take place in strictly alternating fashion. In this way, immediately successive changeovers between the first case and the second case can be avoided, thus also avoiding an associated undesired doubling of the switching frequency, so that the thermal load can be kept low.

As a quantity characterizing the control voltage present at the outputs, the difference between output potentials present at the respective outputs may be used. Alternatively or in addition, this quantity can also include two components in the form of output potentials present at the outputs. These quantities are easy to acquire, and supply all the information required for comprehensive recognition of short-circuits.

In addition, it is advantageous if the quantity characterizing the control voltage is compared in each case to a target value. In this way, it is possible not only to recognize the current presence of a short-circuit, but also to acquire, or even describe, in more detail the scope of the short-circuit and/or its effect.

In a further useful embodiment of the present invention, a difference, acquired in the first case, of the output potentials is compared to a difference of the output potentials acquired in the second case. In this way, it is possible to recognize the presence of short-circuits, and to describe them in more detail, even without prespecified target values.

A further advantage of the method results if an impermissible deviation of the acquired quantity from a target value, or an impermissible deviation of the quantity acquired in the first case from the quantity acquired in the second case, or an absence of changes in the quantity is determined, an entry in an error storage device takes place. The error storage device can for example be read during a maintenance session, enabling targeted and therefore economical repair.

An example embodiment is particularly useful in which, given a detected case of operational disturbance, i.e., determination of an impermissible deviation of the acquired quantity from a target value or an impermissible deviation of the quantity acquired in the first case from the quantity acquired in the second case, or an absence of change of the quantity, the operation of the control circuit is adapted in order to minimize the effects of the disturbance. For example, if there is a short-circuit of the outputs to one of the potentials of the operating voltage, the control voltage at the load can be altered. If necessary, as a function of the direction of the recognized short-circuit, a properly functioning controlling of the load can be restored by modified control signals, or a deviating control voltage can be allowed or brought about, or the control voltage can be shut off completely.

In addition, it is advantageous if, at least at times, in a first operating mode only the first switching arrangement is switched in clocked fashion and in a second operating mode only the second switching arrangement is connected in clocked fashion, and a change between the two operating modes takes place periodically within a working period in such a way that, given the same sign of the control voltage, in the first operating mode a clocked signal is present only at the first output and in the second operating mode a clocked signal is present only at the second output, and in each case the other output has a static signal. In this way, not only is it possible to produce the change of output potentials required for the recognition of short-circuits for operating situations in which, due to a pulse-width modulation of the switching arrangements, the control voltage at the load is deliberately smaller than the difference resulting from the operating voltage potentials; in addition, the electrical power loss caused by a pulse-width modulation is also divided between the two switching arrangements and is thus individually reduced.

A useful embodiment results if, both in a first case and in a second case, the two output potentials are acquired separately from one another and are each subjected to a comparison with a respective target value. In order to distinguish the four possible types of short-circuit, at least two binary-valued measurement results are required. A control voltage presents only a single quantity, whereas the simultaneous evaluation of both output potentials already supplies two binary-valued measurement results from just one measurement. In contrast, given a pure detection of the control voltage, in order to locate a short-circuit at least two measurements in different switching states are required.

BRIEF DESCRIPTION OF THE DRAWINGS

Below, a specific exemplary embodiment of the present invention is explained with reference to the figures.

DETAILED DESCRIPTION OF EXAMPLE EMBODIMENTS

Figure 1:
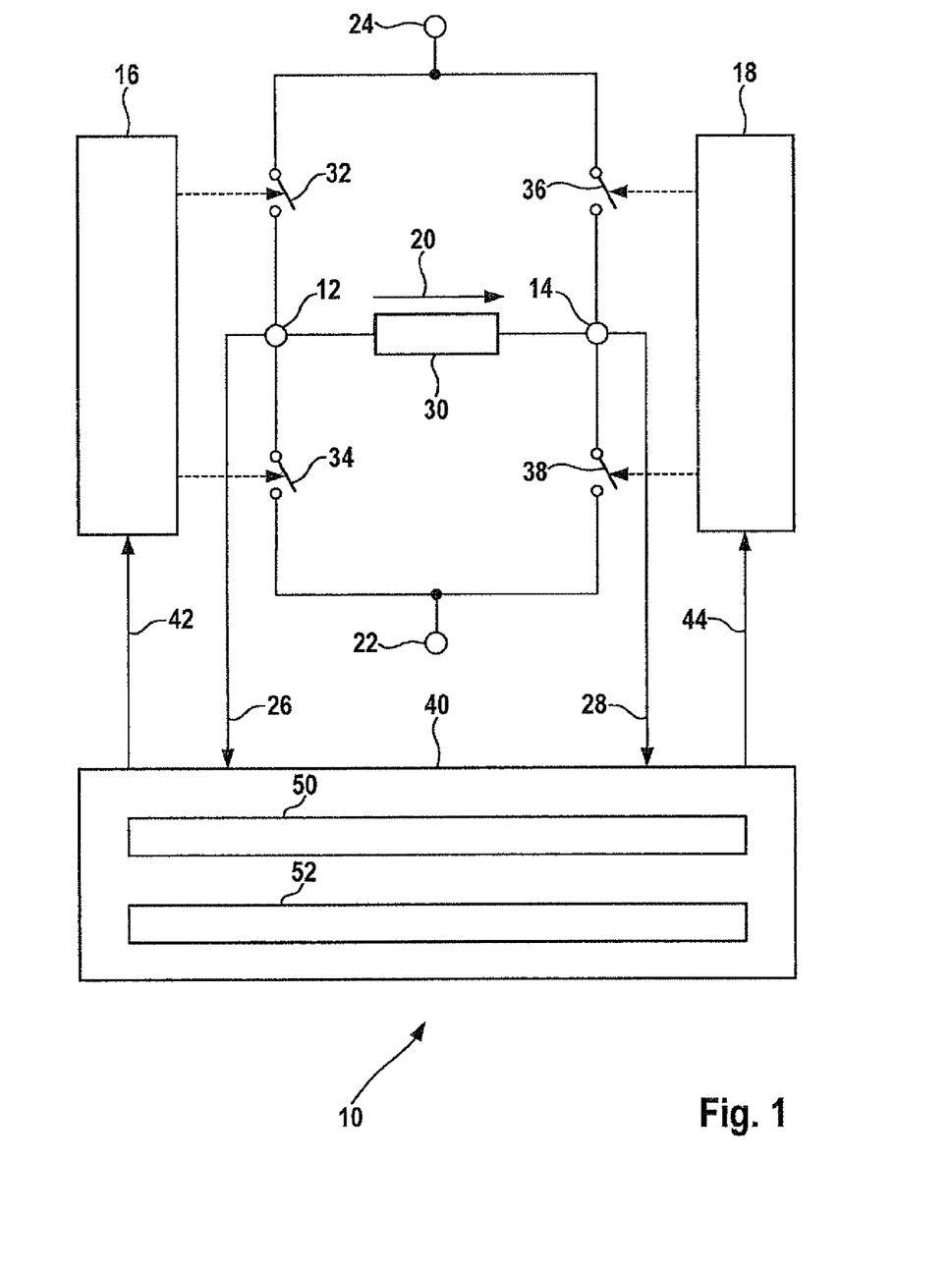
FIG. 1 shows a block switching diagram of a system having a control circuit according to the present invention for providing two output potentials.

FIG. 1 shows a block switching diagram of a system of a control circuit 10 according to the present invention. Shown are control circuit 10 having a first controllable switching arrangement 16 contained therein, and having a second controllable switching arrangement 18, a schematic representation of switches 32, 34, 36, 38 actuated by switching arrangements 16 and 18, which switches may be electromechanical switches or also semiconductor systems, a first potential 22 that can for example be a ground of a motor vehicle, a second potential 24 that can for example be a battery voltage of a motor vehicle, a first output 12 and a second output 14 having a control voltage 20 for connection to a load 30, a control unit 40 having an electrical storage medium 50 and having a computer program 52, feedback lines of output potentials 26 and 28 from outputs 12 and 14 to control unit 40, two control signals 42 and two control signals 44 for controlling switching arrangements 16 and 18 via control unit 40.

Figure 2:
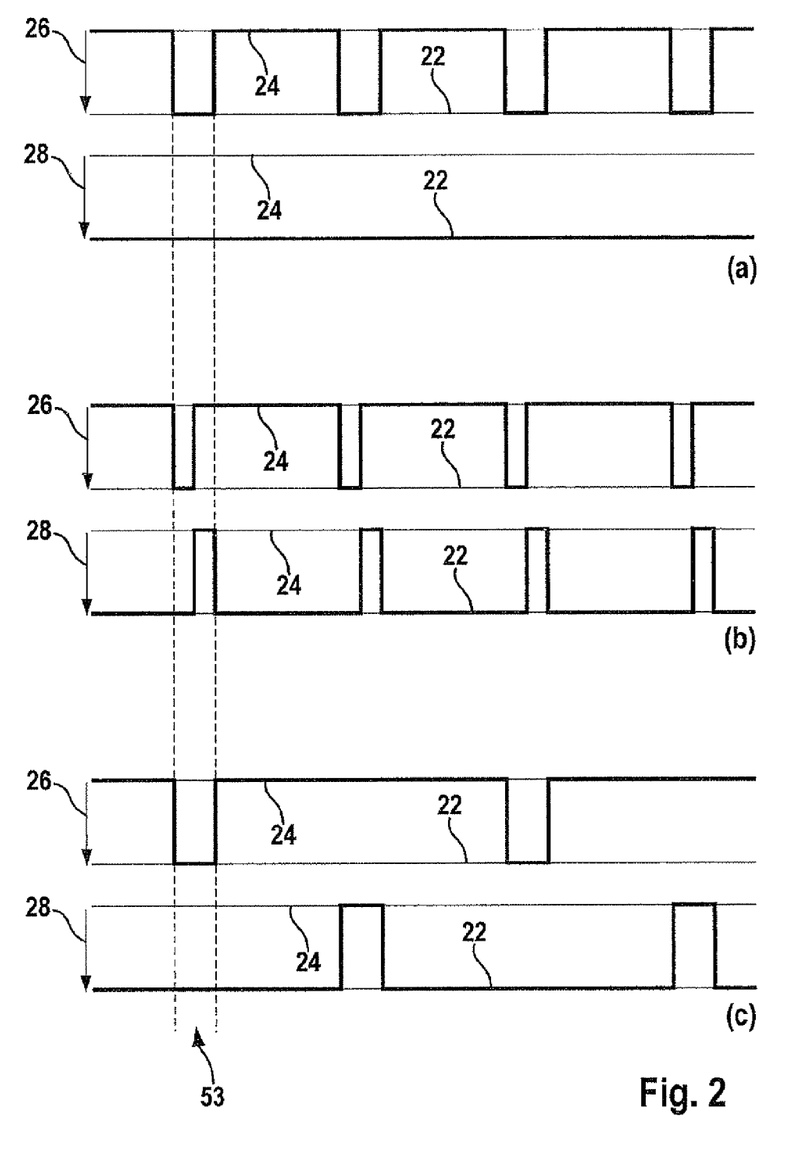
FIG. 2 shows three temporal representations (a), (b), and (c) of the output potentials with positive voltage over the load.

In its top subfigure (a), FIG. 2 shows as an example the temporal course of output potentials 26 and 28 at outputs 12 and 14 for approximately 70 percent average control voltage 20 with positive control voltage 20 over load 30. Only switching means 12 is operated in clocked fashion, corresponding to the prior art. A short-circuit of output 14 to potential 22 can therefore not be recognized.

In temporal comparison thereto, middle subfigure (b) of FIG. 2 shows operation, inter alia, also during a state 53 in which control voltage 20 is intended to briefly be zero (in this Figure and the additional Figures, this state recurs multiple times, but in each Figure it is provided with a reference character only at the far left, at its first temporal occurrence). Apart from state 53, output potential 26 has value UB and output potential 28 has the value zero. During state 53, a changeover takes place repeatedly between a first and a second case. In the first case, both output potentials 26 and 28 are equal to zero, while in the second case they are equal to UB. In the present case, this changeover takes place in immediately successive fashion.

In temporal comparison thereto, lower subfigure (c) of FIG. 2 shows operation again during a state 53 in which control voltage 20 is intended to briefly be zero. In alternating fashion, a changeover takes place from a state 53 to another state, between the above-mentioned first case and the above-mentioned second case. In this way, immediately successive changeovers between the first case and the second case while state 53 still obtains are avoided, which also avoids an associated undesired doubling of the frequency of switching.

Figure 3:
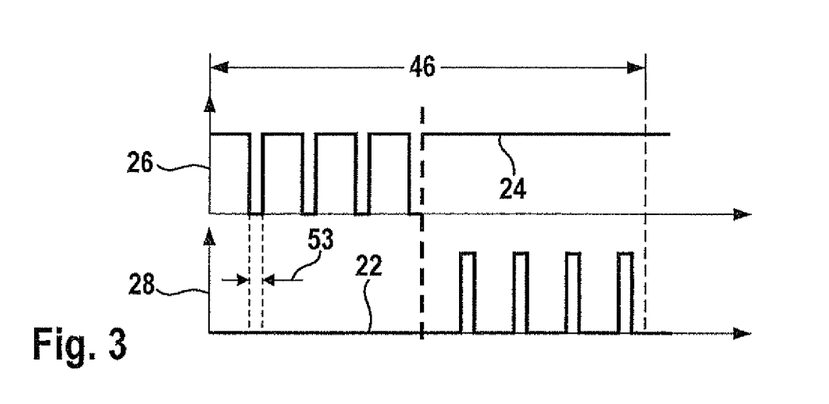
FIG. 3 shows a temporal representation of the output potentials for the case of a method including change between two operating modes and positive voltage over the load.

FIG. 3 shows an operating case equivalent to FIG. 2(c), having on average approximately 70% positive control voltage 20 over load 30, a changeover between two operating modes taking place periodically with a half working period 46. In the first operating mode, shown at the left side in FIG. 3 and lasting the first half period, second output potential 28 is constantly zero. First output potential 26 is clocked (pulse-width-modulated) between an output potential equal to UB and an output potential equal to zero. In the second operating mode, shown at the right side in FIG. 3 and lasting the second half period, first output potential 26 is constantly at UB, and second output potential 28 is operated in clocked (pulse-width-modulated) fashion between UB and zero. As can be seen, working period 46 requires for this purpose a minimum temporal length of two clock periods of a pulse-width-modulated signal (PWM signal), but can also be made much larger.

Figure 4:
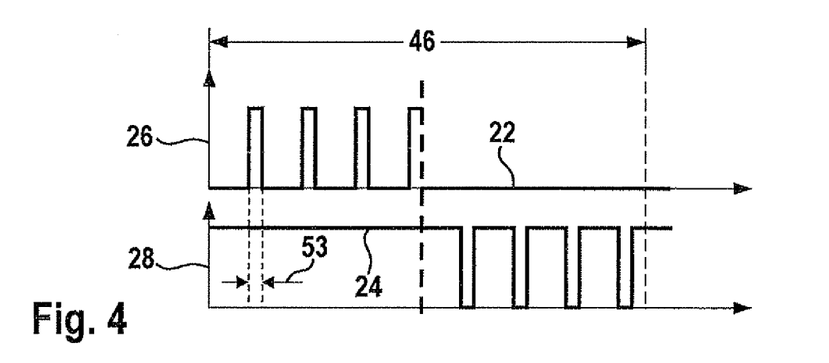
FIG. 4 shows a temporal representation similar to that shown in FIG. 3, with negative voltage over the load.

FIG. 4 shows an operating case similar to that shown in FIG. 3, having on average approximately 70% control voltage 20 over load 30, but control voltage 20 here being negative.

Figure 5:
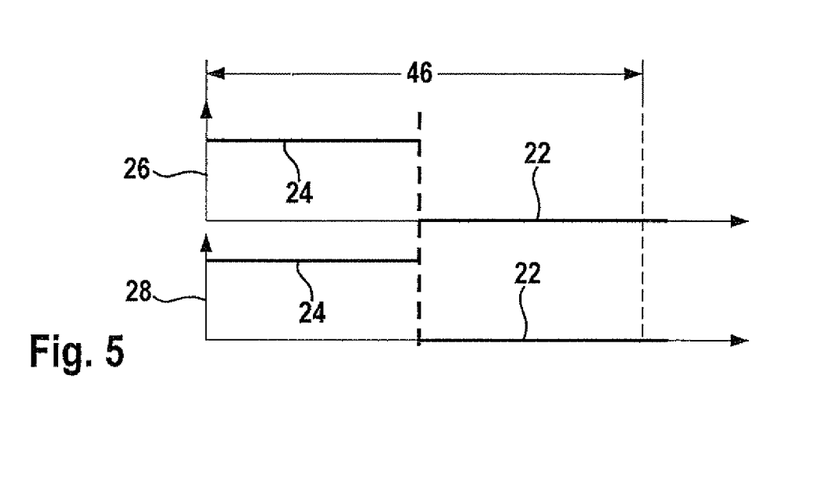
FIG. 5 shows a temporal representation of the output potentials in a case of operation of a control voltage having the value zero.

FIG. 5 shows a temporal course of output potentials 26 and 28 at outputs 12 and 14 for the currentless case of operation with vanishing control voltage 20 over load 30, with periodic and same-sign changeover of outputs 12 and 14 between potentials 22 and 24 in the cycle of a working period 46.

Thus, in the first operating mode both output potentials 26 and 28 are constantly at UB, and in the second case they are constantly at zero.

Figure 6:
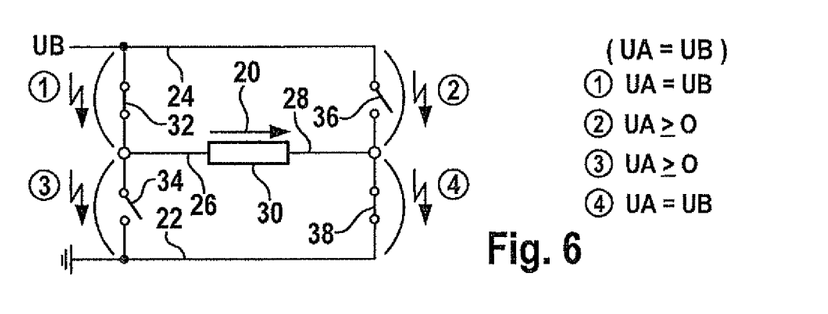
FIG. 6 shows a segment of the switching diagram from FIG. 1, illustrating the effect of the four possible types of short-circuit with a positive control voltage.
Figure 8:
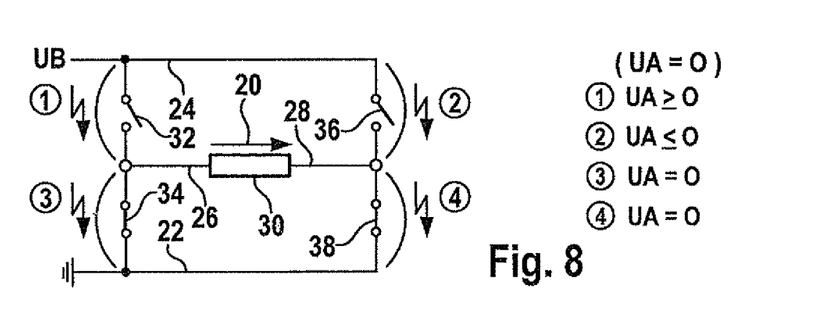
FIG. 8 shows a switching diagram similar to that shown in FIG. 6, with a control voltage having the value zero and connection to a first potential.
Figure 9:
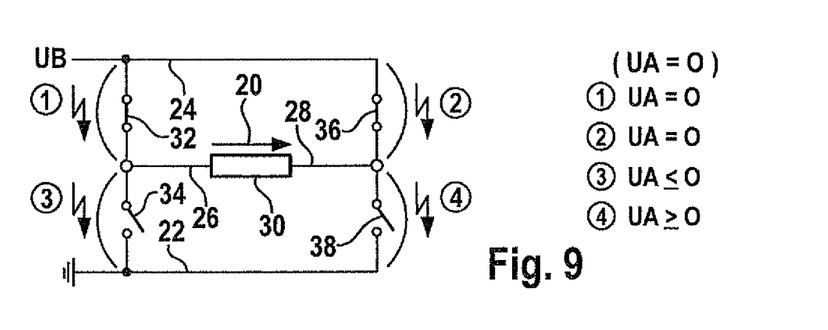
FIG. 9 shows a switching diagram similar to that shown in FIG. 6, with a control voltage having the value zero and connection to a second potential.

FIG. 6 shows a segment of the switching diagram of FIG. 1, namely the actual H-circuit having the four switches 32, 34, 36, 38 and load 30, in order to illustrate the effect of the four possible types of short-circuit given positive control voltage 20, corresponding to the positions of the two closed switches 32, 38 and the two open switches 34, 36. In the depicted position of the switches, the short-circuits designated 1 and 4 do not have a disadvantageous effect and are also not detectable. In contrast, in the depicted position of the switches the short-circuits designated 2 and 3 have an effect on control voltage 20, in a manner depending on their ohmic conductance value relative to the conductance value of the two closed switches 32, 38. The resulting control voltage 20 has a positive sign, and its magnitude is between zero and a value determined by the type of short-circuit and by second potential 24, which in the present case is battery voltage UB of the motor vehicle. For the case of a short-circuit designated 1 or 4, control voltage 20 (designated UA in the described equations) corresponds in each case to battery voltage UB. In the case of a short-circuit designated 2 or 3, control voltage 20 has a value greater than or equal to zero. In the depicted position of the switches, the short-circuits designated 2 and 3 cannot be distinguished solely by the sign and magnitude of the resulting control voltage 20; rather, for this purpose at least one switching state differing therefrom, according to FIG. 8 or FIG. 9, is required. This is described in more detail below.

In an embodiment in which control voltage 20 is not measured, but output potentials 26 and 28 are measured, the short-circuit can in contrast to be assigned to one of the four short-circuit types already after a single measurement, as long as the short-circuit does not act parallel to a switch 32, 34, 36, 38 that is closed in the currently obtaining switching state. Of course, independent of the use of the measurement method according to the present invention a type of short-circuit designated by 2 or 3 in FIG. 6 will always result in a high flow of current between potentials 22 and 24, against which corresponding measures are to be taken.

Figure 7:
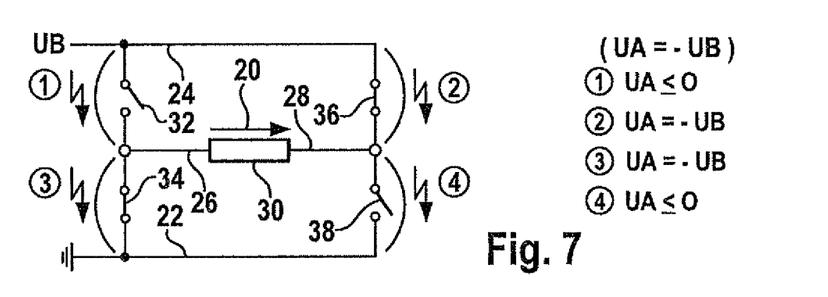
FIG. 7 shows a switching diagram similar to that shown in FIG. 6 with a negative control voltage.

FIG. 7 shows a control circuit having positions of the switches (32-38) differing from that shown in FIG. 6. The switches (32, 38) at top left and lower right are open, and the other switches (34, 36) are closed. In the case of a short-circuit designated 2 or 3, control voltage 20 (designated UA in the described equations) corresponds in each case to negative battery voltage UB. In the case of a short-circuit designated 1 or 4, control voltage 20 has a value less than or equal to zero.

FIG. 8 shows a control circuit having positions of switches 32-38 that are again different from those shown in FIG. 6 and FIG. 7. Switches 32, 36 at top left and top right are open, while the other switches 34, 38 are closed. In the case of a short-circuit designated 3 or 4, control voltage 20 (designated UA in the described equations) corresponds in each case to the value zero. For a short-circuit designated 1, control voltage 20 has a value greater than or equal to zero. For a short-circuit designated 2, control voltage 20 has a value less than or equal to zero.

FIG. 9 shows a control circuit having positions of switches 34, 38 that again differ from those shown in FIG. 6, FIG. 7, and FIG. 8. Switches 34, 38 at the lower left on lower right are open, while the other switches 32, 36 are closed. In the case of a short-circuit designated 1 or 2, control voltage 20 (designated UA in the described equations) corresponding in each case to the value zero. In the case of a short-circuit designated 4, control voltage 20 has a value greater than or equal to zero. In the case of a short-circuit designated 3, control voltage 20 has a value less than or equal to zero.

Figure 10:
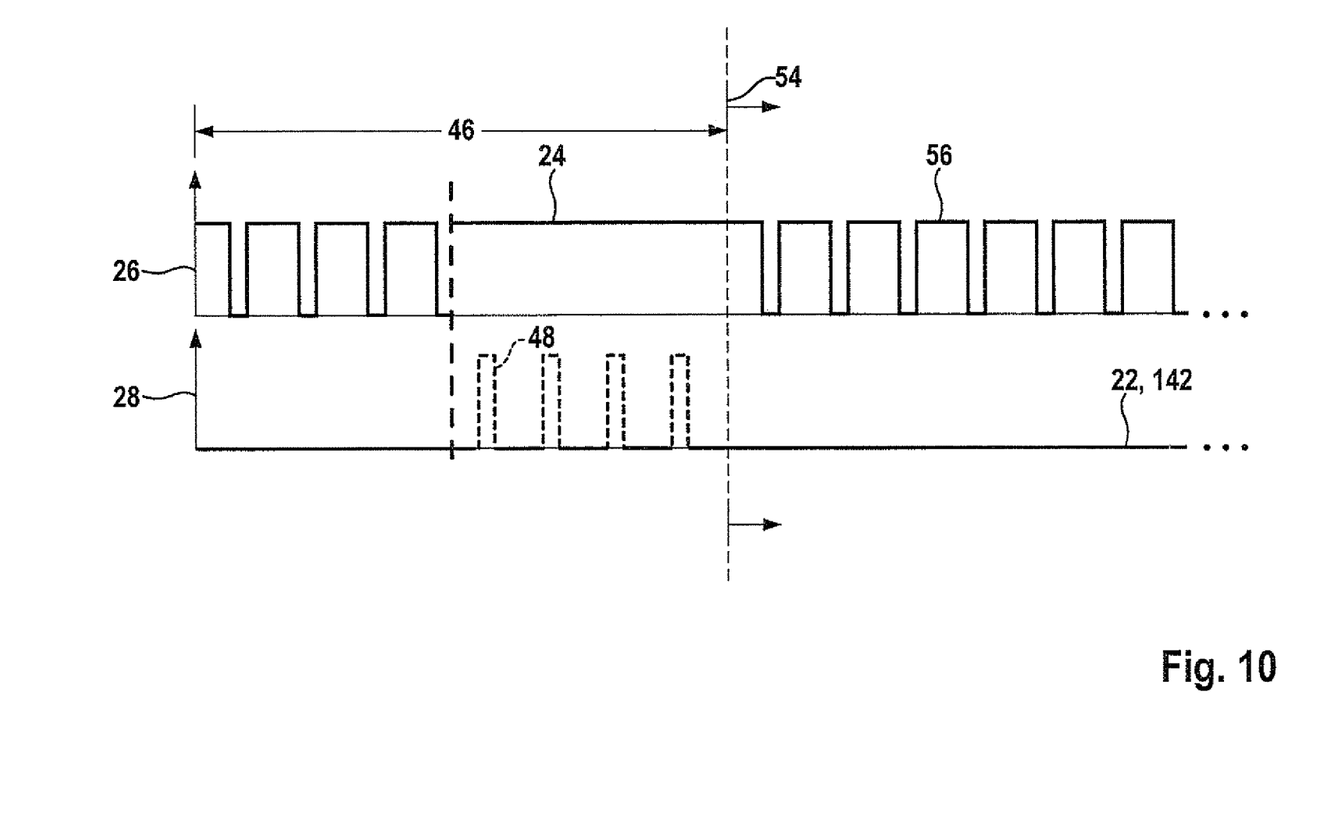
FIG. 10 shows as an example a temporal course of the output potentials, after an assumed short-circuit of an output to a potential.

FIG. 10 shows as an example a temporal course of output potentials 26 and 28 in the case of an assumed short-circuit of output 14 to potential 22 (short-circuit 4 in FIGS. 6 through 9). Working period 46 is shown, and switching processes 48, which have vanished as a result of the short-circuit of output 14 to potential 22, are shown in broken lines. Control and regulating device 40 begins to act at a point in time 54. Also shown is pulse sequence 56, emitted continuously beginning at this point, at output potential 26, and first potential 22 continuously emitted at output potential 28. It will be recognized that in the second part of working period 46, short-circuited pulses 48 result in an averaged control voltage 20 of 100 percent, instead of the 70 percent demanded at load 30. At the beginning of time 54, control and regulating device 40 therefore switches over, matching the assumed case of error, to pulse sequences as were produced in the present case in the first part of working period 46. At the same time, this event is detected as a case of malfunction and is entered into an error memory, and a notification of the event is issued to downstream assemblies of the vehicle.

Figure 11:
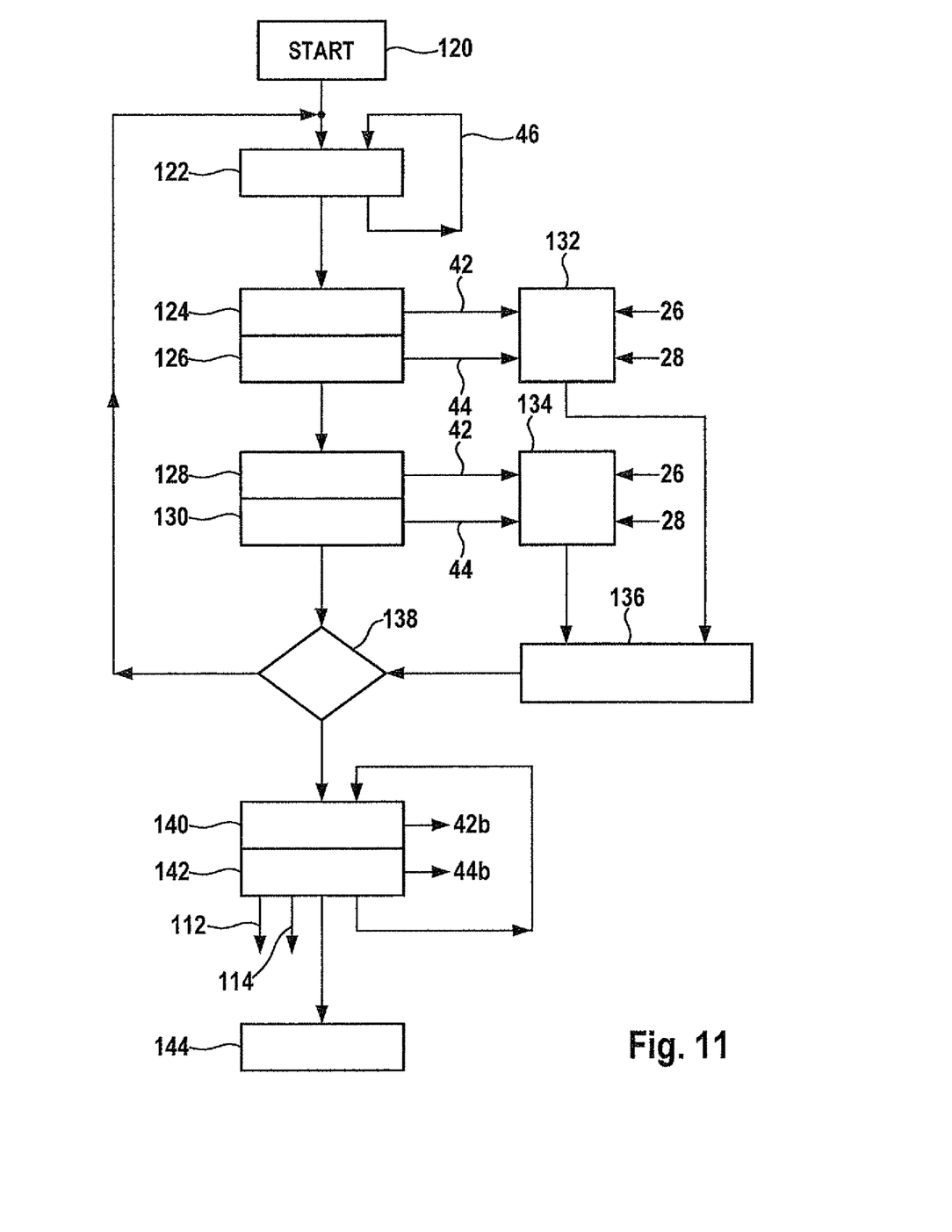
FIG. 11 shows a flow diagram of a method for controlling the control circuit of FIG. 1 given an assumed short-circuit of an output to a potential.

FIG. 11 shows as an example a flow diagram of a method for operating a control circuit 10 in the case of an assumed short-circuit of output 14 to potential 22. After starting in block 120, in block 122 synchronization with working period 46 takes place, or this period is produced. In each of blocks 124 and 126, two control signals 42 and 44 for the first part of working period 46 are produced in accordance with the current specifications of control and regulating device 40 for the desired case of operation. Subsequently, in each of blocks 128 and 130 two control signals 42 and 44 for the second part of working period 46 are produced. In comparators 132 and 134, causal agreement of control signals 42 and 44 with output potentials 26 and 28 is sought. As needed, a logic unit 136 controls decision unit 138 as to whether (in the error-free case) the cycle is continued at block 120 or whether (in case of error) two modified control signals 42b and 44b for switching arrangements 16 and 18 are produced at blocks 140 and 142. In block 144, it is decided whether the partial procedure described by FIG. 11 is continued, repeated, or terminated with a jump back to the calling main program part. Of course it is to be understood that the flow diagram will have a different structure if, as indicated in a specific embodiment of the present invention, mere changes in output potentials 26 and 28 are used as a criterion for the presence of short-circuits at outputs 12 or 14.

Figure 12:
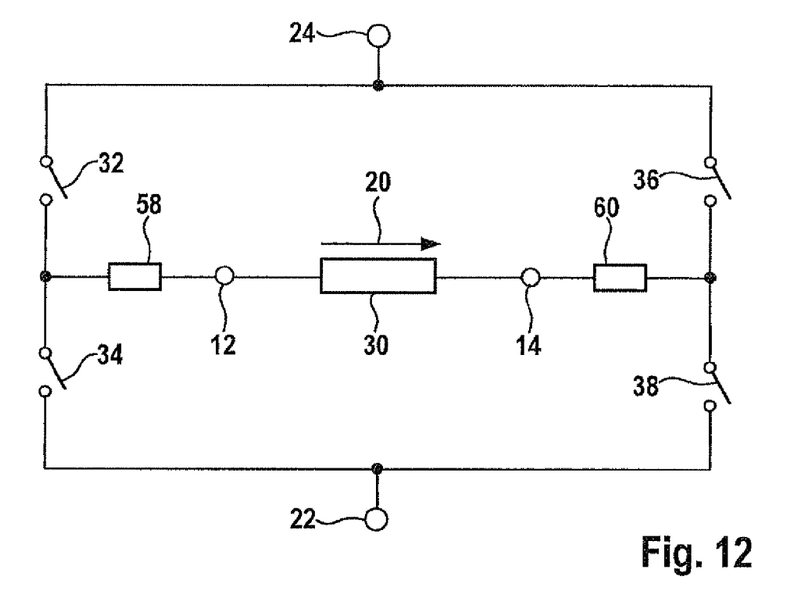
FIG. 12 shows a segment of a control circuit similar to that shown in FIG. 1 having shunt resistors connected in series to the outputs.

FIG. 12 shows a segment of a control circuit similar to that shown in FIG. 1. Two shunt resistors 58, 60 have been added for current measurement, connected in series to outputs 12 and 14.

A potential 24 is assumed that is positive relative to a potential 22. A table illustrates the evaluation:

| Switches closed | Target value of control voltage 20 | If current in 58 is too high | If current in 60 is too high | If current in 58 and 60 is too high |
|---|---|---|---|---|
| 34, 38 | zero | (II) | (IV) | — |
| 32, 36 | zero | (I) | (III) | — |
| 32, 38 | positive | (I) | (IV) | (V) |
| 34, 36 | negative | (II) | (III) | (V) |

(I): Output 12 has a possible short-circuit to potential 22.
(II): Output 12 has a possible short-circuit to potential 24.
(III): Output 14 has a possible short-circuit to potential 22.
(IV): Output 14 has a possible short-circuit to potential 24.
(V): Load 30 has a possible short-circuit.

Figure 13:
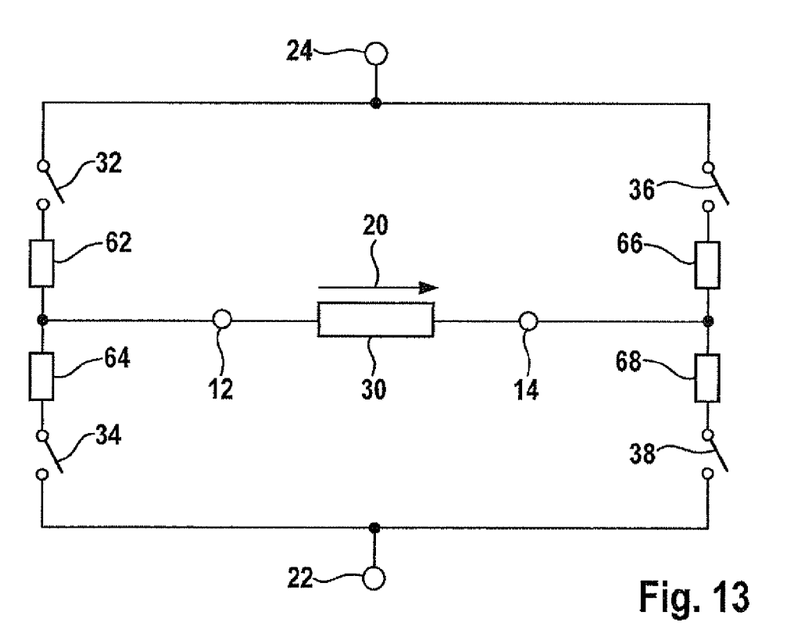
FIG. 13 shows a segment of a control circuit similar to that shown in FIG. 1 having shunt resistors connected in series to the switches of the bridge.

FIG. 13 shows a segment of a control circuit similar to that shown in FIG. 1. Four shunt resistors 62, 64, 66, 68 have been added for current measurement, connected in series to switches 32, 34, 36, 38.

A potential 24 is assumed that is positive relative to a potential 22.

A table illustrates the evaluation:

| Switches closed | Target value of control voltage 20 | If current in 62 is too high | If current in 64 is too high | If current in 66 is too high | If current in 68 is too high |
|---|---|---|---|---|---|
| 34, 38 | zero | — | (II) | — | (IV) |
| 32, 36 | zero | (I) | — | (III) | — |
| 32, 38 | positive | (I) | — | — | (IV) |
| 34, 36 | negative | — | (II) | (III) | — |

(I): Output 12 has a possible short-circuit to potential 22.
(II): Output 12 has a possible short-circuit to potential 24.
(III): Output 14 has a possible short-circuit to potential 22.
(IV): Output 14 has a possible short-circuit to potential 24.

Possible short-circuits of load 30 can be recognized in a manner similar to the procedure according to FIG. 12, if more than one shunt resistor 62, 64, 66, 68 results in an excessively high current.

What is claimed is:

1. A method for operating a control circuit for use in a motor vehicle, the control circuit having a first output and a second output and having an allocated first switching arrangement and an allocated second switching arrangement, in which a control voltage present between the first output and the second output for operating a load is formed in that the first output is optionally connected by the first switching arrangement to a first potential or to a second potential, and the second output is optionally connected by the second switching arrangement to the first potential or to the second potential, a state in which the control voltage is intended to be at least briefly and at least approximately zero being brought about, in a first case, in that the first output and the second output are simultaneously connected by the first switching arrangement and the second switching arrangement, respectively, to the first potential, and being brought about in a second case in that the first output and the second output are simultaneously connected by the first switching arrangement and the second switching arrangement, respectively, to the second potential, the method comprising:

bringing about at least once, both the first case and the second case during operation of the control circuit; and
acquiring and subjecting to a comparison in both the first and second case at least one of a quantity that characterizes the control voltage present at the first output and the second output, a quantity that characterizes a current flowing through at least one shunt resistor situated in series to the first output and the second output, and a quantity that characterizes a current flowing through at least one shunt resistor in series to switches.

2. The method as recited in claim 1, wherein during a state in which the control voltage is at least briefly and at least approximately intended to be zero, a changeover takes place at least once one of between the first case and the second case, or between the second case and the first case.

3. The method as recited in claim 1, wherein phases in which the control voltage is intended to be at least briefly and at least approximately zero, are brought about according to a particular clocking schema, once through the first case and another time through the second case.

4. The method as recited in claim 1, wherein the quantity that characterizes the control voltage present at the first output and the second output includes a difference between output potentials present at the first output and the second output.

5. The method as recited in claim 1, wherein the quantity that characterizes the control voltage present at the first output and the second output includes absolute values of output potentials present at the first output and the second output.

6. The method as recited in claim 4, wherein the quantity is compared in each case with a target value.

7. The method as recited in claim 4, wherein a difference between the output potentials acquired in the first case is compared with a difference between the output potentials acquired in the second case.

8. The method as recited in claim 4, wherein at least one of: i) an impermissible deviation of the acquired quantity from a target value, ii) an impermissible deviation of the quantity acquired in the first case from the quantity acquired in the second case, and iii) an absence of change in the quantity, causes an entry in an error memory device.

9. The method as recited in claim 4, wherein whenever an impermissible deviation of the acquired quantity from a target value is determined, an impermissible deviation of the quantity acquired in the first case from the quantity acquired in the second case is determined, or an absence of change in the quantity is determined, operation of the control circuit is switched over to an emergency operating mode.

10. The method as recited in claim 1, wherein, at least at times, in a first operating mode only the first switching arrangement is switched in clocked fashion and in a second operating mode only the second switching arrangement is switched in clocked fashion, a changeover between the first operating mode and the second operating mode taking place periodically such that, given a same sign of the control voltage, in the first operating mode a clocked signal is present only at the first output and in the second operating mode a clocked signal is present only at the second output, the other output in each case having a static signal.

11. The method as recited in claim 1, wherein both in the first case and in the second case two output potentials are acquired separately from one another and are subjected to a comparison with a respective target value.

12. A non-transitory computer readable storage device storing a computer program, which, when executed by a processor, causes the processor to operate a control circuit for use in a motor vehicle, the control circuit having a first output and a second output and having an allocated first switching arrangement and an allocated second switching arrangement, in which a control voltage present between the first output and the second output for operating a load is formed in that the first output is optionally connected by the first switching arrangement to a first potential or to a second potential, and the second output is optionally connected by the second switching arrangement to the first potential or to the second potential, a state in which the control voltage is intended to be at least briefly and at least approximately zero being brought about, in a first case, in that the first output and the second output are simultaneously connected by the first switching arrangement and the second switching arrangement, respectively, to the first potential, and being brought about in a second case in that the first output and the second output are simultaneously connected by the first switching arrangement and the second switching arrangement, respectively, to the second potential, the method comprising:

bringing about at least once, both the first case and the second case during operation of the control circuit; and acquiring and subjecting to a comparison in both the first and second case at least one of a quantity that characterizes the control voltage present at the first output and the second output, a quantity that characterizes a current flowing through at least one shunt resistor situated in series to the first output and the second output, and a quantity that characterizes a current flowing through at least one shunt resistor in series to switches.

13. The non-transitory computer readable storage device as recited in claim 12, Wherein the quantity that characterizes the control voltage present at a first output and the second output includes a difference between output potentials present at the first output and the second output.

14. The non-transitory computer readable storage device as recited in claim 13, wherein the method further comprises generating an alarm condition whenever (a) an impermissible deviation of the acquired quantity from a target value is determined, (b) an impermissible deviation of the quantity acquired in the first case from the quantity acquired in the second case is determined, or (c) an absence of change in the quantity is determined.

15. The non-transitory computer readable storage device as recited in claim 13, wherein the method further comprises adapting an operation of the control circuit to minimize an effect of a determined impermissible deviation of the acquired quantity from a target value.

16. The non-transitory computer readable storage device as recited in claim 15, wherein the adaptation includes altering the control voltage at the load.

17. The non-transitory computer readable storage device as recited in claim 13, wherein the method further comprises adapting an operation of the control circuit to minimize an effect of a determined impermissible deviation of the quantity acquired in the first case from the quantity acquired in the second case.

18. The non-transitory computer readable storage device as recited in claim 17, wherein the adaptation includes altering the control voltage at the load.

19. The non-transitory computer readable storage device as recited in claim 13, wherein the method further comprises adapting an operation of the control circuit to minimize an effect of a determined absence of change in the quantity.

20. The non-transitory computer readable storage device as recited in claim 19, wherein the adaptation includes altering the control voltage at the load.

\* \* \* \* \*